United States Patent
Danielson et al.

(10) Patent No.: US 6,207,603 B1
(45) Date of Patent: Mar. 27, 2001

(54) SOLAR CELL COVER GLASS

(75) Inventors: Paul S. Danielson, Corning; Ronald L. Stewart, Big Flats, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/298,149

(22) Filed: Apr. 23, 1999

Related U.S. Application Data

(60) Provisional application No. 60/118,948, filed on Feb. 5, 1999.

(51) Int. Cl.[7] .......................... C03C 3/078; C03C 3/085; C03C 3/093; C03C 3/095
(52) U.S. Cl. ................. 501/64; 501/67; 501/69; 501/72; 136/256; 136/257
(58) Field of Search ..................... 136/256, 257; 501/64, 67, 69, 72

(56) References Cited

U.S. PATENT DOCUMENTS

| | | | |
|---|---|---|---|
| 4,106,946 | * 8/1978 | Ritze ........................... | 501/67 |
| 4,746,634 | 5/1988 | Danielson ..................... | 501/67 |
| 5,108,960 | * 4/1992 | Boek et al. .................... | 501/64 |
| 5,219,801 | 6/1993 | Shorrock et al. .............. | 501/65 |
| 5,569,630 | * 10/1996 | Landa et al. .................. | 501/64 |
| 5,618,763 | * 4/1997 | Frank et al. ................... | 501/5 |
| 5,714,422 | * 2/1998 | Favrot et al. .................. | 501/67 |
| 5,827,790 | 10/1998 | Evans et al. ................... | 501/66 |

FOREIGN PATENT DOCUMENTS

| | | |
|---|---|---|
| 0 261 885 A1 | 9/1987 | (EP). |
| 0 505 061 A3 | 3/1992 | (EP). |
| 0 779 252 A1 | 11/1996 | (EP). |
| 54-055016 | * 5/1979 | (JP). |
| 62-187141 | 8/1987 | (JP). |
| 63-215533 | * 9/1998 | (JP). |

OTHER PUBLICATIONS

"CMG Solar Cell Coverglasses" report from Pilkington Space Technology (no further info prov.) (No Date Available).

* cited by examiner

*Primary Examiner*—Mark L. Bell
*Assistant Examiner*—David Sample
(74) *Attorney, Agent, or Firm*—Milton M. Peterson

(57) ABSTRACT

A borosilicate glass having properties that enable it to be drawn as microsheets for use as a solar cell cover glass, and a solar cell having such microsheet as a cover glass, the glass having a composition consisting essentially of, expressed in terms of weight percent on an oxide basis:

| | | | |
|---|---|---|---|
| $SiO_2$ | 59–69 | ZnO | 6.5–8.5 |
| $B_2O_3$ | 8.5–14 | $CeO_2$ | 0.25–3 |
| $Al_2O_3$ | 2–2.5 | $TiO_2$ | 0–1 |
| $Na_2O$ | 5.5–12.5 | $CeO_2 + TiO_2$ | 0.5–4 |
| $K_2O$ | 0–8 | $Sb_2O_3$ | 0–0.5. |

14 Claims, 1 Drawing Sheet

SOLAR CELL COVER GLASS

This application claims the benefit of U. S. Provisional Application, Ser. No. 60/118,948, filed Feb. 5, 1999 entitled SOLAR CELL COVER GLASS, by Paul S. Danielson and Ronald L. Stewart.

FIELD OF THE INVENTION

Glasses adapted to produce microsheet cover glass for use in solar cells.

BACKGROUND OF THE INVENTION

U.S. Pat. No. 4,746,634 (Danielson) discloses glasses having borosilicate compositions developed for production of microsheet to be used in cover glasses on solar cells. The cover glasses are strongly resistant to solarization, exhibit a cutoff value of 50% at 370 nm. for ultraviolet (UV) radiation, and have properties adapted to forming microsheets.

The glass compositions disclosed in the Danielson patent consist essentially of, expressed in terms of weight percent on an oxide basis:

| | | | |
|---|---|---|---|
| $SiO_2$ | 59–63 | ZnO | 6.5–7.5 |
| $B_2O_3$ | 8.75–10 | $CeO_2$ | 4–6 |
| $Al_2O_3$ | 2–2.5 | $TiO_2$ | 1–3 |
| $Na_2O$ | 6.75–7.75 | $CeO_2 + TiO_2$ | 6–8 |
| $K_2O$ | 6.25–7.0 | $Sb_2O_3$ | 0–0.5 |

A commercial glass, based on these composition ranges, was developed that has proven eminently satisfactory for use in producing microsheet cover glass for solar cells. Recent developments in solar cell use, particularly for space vehicles or a station, have imposed severe limitations on cover glasses for such cells.

One such requirement is to provide as great a solar spectral transmission as possible. This is necessary to provide maximum efficiency in solar cells used to provide power to space vehicles. It is a purpose of the present invention to provide a cover glass improved in these respects, and a solar cell embodying such cover glass.

In this regard, another purpose is to provide a glass having a sharp cutoff in the UV portion of the spectrum. This maximizes solar intensity while still protecting an organic adhesive against deterioration by shorter wavelength, UV radiation.

Finally, the possible danger of a static electrical discharge in a space vehicle imposes a requirement of a lower bulk electrical resistivity in the glass. This is necessary to aid in reducing buildup of static charge on the space vehicle. It is, then, another purpose to provide a cover glass having a low bulk resistivity.

Over and above providing these several improvements, it has also been required that the properties described in the Danielson patent for forming microsheet glass be at least retained, and preferably improved. A final purpose, then, is to reach this desired end.

SUMMARY OF THE INVENTION

The invention resides, in part, in a glass that has properties that permit the glass to be drawn as microsheet, that has a transmission greater than about 90% at wavelengths greater than 370 nm., that has a sharp cutoff between 310–370 nm., that has a transmission no greater than about 50% at about 330 nm., and that has a composition consisting essentially of, expressed in terms of weight percent on an oxide basis:

| | | | |
|---|---|---|---|
| $SiO_2$ | 59–69 | ZnO | 6.5–8.5 |
| $B_2O_3$ | 8.5–14 | $CeO_2$ | 0.25–3 |
| $Al_2O_3$ | 2–2.5 | $TiO_2$ | 0–1 |
| $Na_2O$ | 5.5–12.5 | $CeO_2 + TiO_2$ | 0–0.5 |
| $K_2O$ | 0–8 | $Sb_2O_3$ | 0–0.5 |

The invention further resides in a solar cell having, as a component, a cover glass as defined above.

BRIEF DESCRIPTION OF THE DRAWINGS

In the accompanying drawing.

DESCRIPTION OF THE INVENTION

The present invention arose from efforts to provide improved properties in a glass commercially available in microsheet form. While not so limited, the glass, drawn as microsheet, finds specific application as a cover glass for solar cells, and is so described here.

Microsheet may be drawn in a range of thicknesses, e.g., 50–500 microns. However, the conventional thickness for a microsheet cover glass used in solar cells is 150 microns (0.006 inches). Hereafter, all references will be to microsheet of that thickness, unless otherwise indicated.

Solar cells were devised as a means of converting solar radiation into a source of electricity, primarily for residential use. More recently, attention has turned to use of such solar cells as a source of power for spacecraft. This utility has imposed new requirements, as well as enhancing the original requirements.

Figure 1:
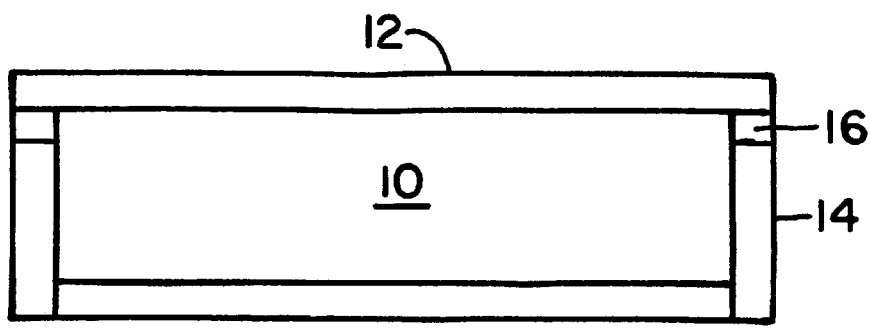
FIG. 1 is a schematic side view of a solar cell constructed with a cover glass in accordance with the present invention.

FIG. 1 is a schematic side view of a simple solar cell generally designated 10. Solar cell 10 is basically composed of a cover glass 12 sealed to the main body of the cell 14 by a seal 16. The present invention is not concerned with the construction, or functioning, of main body 14. Therefore, that component is shown only as a shell in the interest of simplicity.

Cover glass 12 is commonly a layer of glass microsheet sealed to the main body 14. It acts as a shield to prevent dust, or other debris, from entering the cell. Seal 16 may be a fusion seal if care is taken to closely match the coefficient of thermal expansion (CTE) of the material in body 14 with that of the glass 12. However, it is frequently desirable to avoid this limiting effect on the materials of body 14 and glass 12. Seal 16 may, therefore, be an organic plastic material.

However, short wavelength UV radiation may deteriorate this plastic material. Therfore, it becomes necessary to essentially eliminate much of the UV portion of the radiation impinging on cover glass 12, preferably by absorption in the glass. At the same time, it is desirable to secure as high a transmission of the useful portion of the solar radiation as possible. This combination of requirements has made it critical to obtain a very sharp, transmission cutoff in the long wavelength portion of the UV spectrum in cover glass 12.

Cover glass 12 should provide maximum transmission of solar radiation at wavelengths in the visible portion of the spectrum, that is, wavelengths greater than 400 nm. Concomitant therewith, the glass should transmit minimal radiation in the UV portion of the spectrum below 310 nm. In other words, the transmission curve in the vicinity of 340 to 350 nm. in the UV portion of the spectrum should be as sharp, or steep, as possible.

This boundary portion of the curve is commonly referred to as the edge, or cut-on. A customary measure is the transmission in percent of a 150 micron thick glass at a wavelength of 370 nm. However, the present glasses provide a sharp edge positioned at shorter UV wavelengths. This edge is better characterized by transmission values at 330, 350 and 370 nm.

The invention is further described with reference to specific embodiments, and to relevant properties of those embodiments.

TABLE I shows, in weight percent on an oxide basis, the compositions for several glasses in accordance with the present invention. For comparison, the composition of example 5 in TABLE I of the Danielson patent is included as example 20 in present TABLE I.

the larger contents were necessary to impart adequate resistance to discoloration, and consequent loss of transmission. This was particularly true with respect to use in space where the problem is much more severe than on earth. On earth, the atmosphere functions as a solarization shield. It was, then, quite unexpected to find that less than 2% $CeO_2$, and as little as 0.25%, both by weight, could provide adequate resistance to solarization in space.

Accordingly, $CeO_2$ contents are preferably at least 0.25% by weight, but less than 2.0%. The $TiO_2$ content is at least 0.25% by weight, and may range up to about 1.0%.

As explained earlier, solar cells are used on spacecraft as a source of power. However, such spacecraft power components must not contribute to a buildup of static electrical charge on or in the spacecraft. This has led to a desire for a cover glass having a low bulk resistivity. It has been found that this desired end can be achieved in the present glasses by adjusting the ratio of $Na_2O/K_2O$. The ratio will be greater than 1:1, preferably greater than 2:1, and maybe up to 6:1.

TABLE II, below, demonstrates the reduction in resistivity that can be achieved in the present glasses without losing

TABLE I

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $SiO_2$ | 63.9 | 63.4 | 64.15 | 63.65 | 64.4 | 65.15 | 64.35 | 63.9 | 65.4 | 66.4 | 66.4 | 66.5 | 66.5 | 65.9 | 66.0 |
| $Al_2O_3$ | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 |
| $B_2O_3$ | 9.3 | 9.3 | 9.3 | 9.3 | 9.3 | 9.3 | 9.3 | 9.3 | 9.3 | 9.3 | 9.29 | 9.29 | 9.29 | 9.30 | 9.30 |
| $Na_2O$ | 7.15 | 7.15 | 10.1 | 10.1 | 7.15 | 7.15 | 10.1 | 10.1 | 7.15 | 7.15 | 10.1 | 10.1 | 11.8 | 7.15 | 7.15 |
| $K_2O$ | 6.65 | 6.65 | 3.7 | 3.7 | 6.65 | 6.65 | 3.7 | 3.7 | 6.65 | 6.65 | 3.7 | 3.7 | 2.0 | 6.65 | 6.65 |
| ZnO | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| $CeO_2$ | 2.5 | 3.0 | 2.5 | 2.0 | 2.5 | 2.0 | 2.5 | 3.0 | 2.0 | 0.75 | 0.75 | 0.75 | 0.75 | 1.25 | 1.25 |
| $TiO_2$ | 1.0 | 1.0 | 0.75 | 0.75 | 0.5 | 0.25 | 0.25 | 0.5 | 0 | 0.25 | 0.25 | 0.15 | 0.15 | 0.25 | 0.10 |
| $Sb_2O_3$ | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
|  | 16 | 17 | 18 | 19 | 20 | 21 | 22 | 23 | 24 | 25 | 26 | 27 | 28 | 29 | 30 |
| $SiO_2$ | 66.6 | 66.0 | 66.1 | 66.2 | 61.4 | 66.1 | 65.9 | 66.1 | 66.3 | 67.3 | 67.3 | 65.6 | 65.4 | 65.7 | 64.45 |
| $Al_2O_3$ | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 |
| $B_2O_3$ | 9.30 | 9.30 | 9.30 | 9.30 | 9.30 | 9.30 | 9.30 | 13 | 13 | 14 | 14 | 9.30 | 9.30 | 9.30 | 11.10 |
| $Na_2O$ | 7.15 | 7.15 | 7.15 | 7.15 | 7.15 | 7.15 | 10.1 | 10.1 | 6.9 | 5.9 | 6.9 | 7.15 | 7.15 | 7.15 | 7.15 |
| $K_2O$ | 6.65 | 6.65 | 6.65 | 6.65 | 6.65 | 6.65 | 3.7 | — | 3.0 | 1.0 | — | 6.65 | 6.65 | 6.65 | 6.65 |
| ZnO | 7.0 | 7.0 | 7.0 | 7.0 | 7.0 | 7.0 | 7.0 | 7.0 | 7.0 | 8.0 | 8.0 | 7.0 | 7.0 | 7.0 | 7.0 |
| $CeO_2$ | 0.5 | 0.4 | 0.5 | 0.4 | 5.0 | 1.0 | 1.0 | 1.0 | 1.0 | 1.0 | 1.0 | 0.75 | 1.0 | 1.25 | 0.50 |
| $TiO_2$ | 0.25 | 1.0 | 0.75 | 0.75 | 1.0 | 0.25 | 0.5 | 0.25 | 0.25 | 0.25 | 0.25 | 1.0 | 1.0 | 0.75 | 0.75 |
| $Sb_2O_3$ | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |

Figure 2:
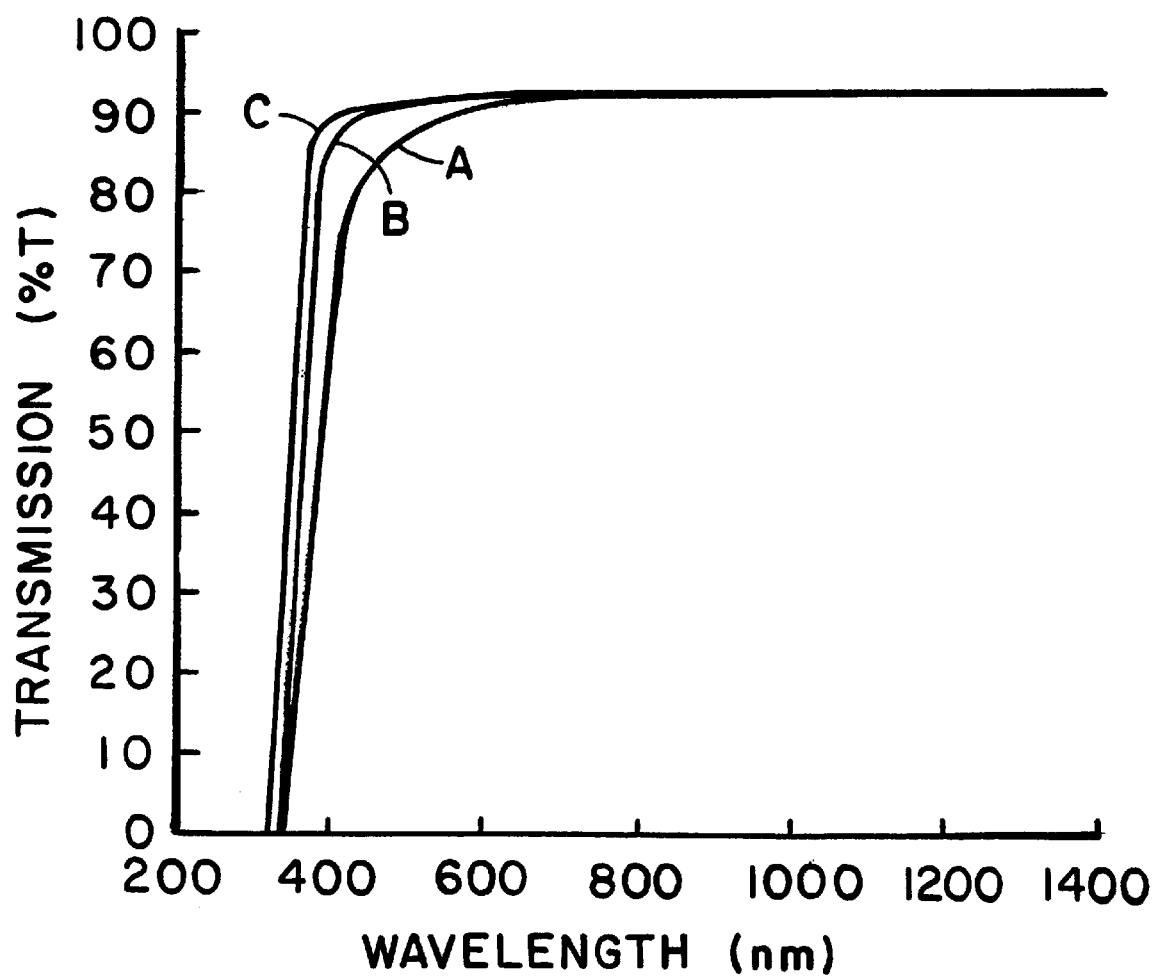
FIG. 2 is a graphical representation illustrating the transmission characteristics of glasses in accordance with the present invention.

FIG. 2 is a graphical representation illustrating the transmission characteristics of glasses in accordance with the present invention. Transmittance values, in percent, are plotted on the vertical axis; wavelengths in nm. are plotted on the horizontal axis.

In FIG. 2, curve A is the transmission curve for a glass having the composition shown as example 5 in TABLE I of the Danielson patent (example 20 in present TABLE I). Curves B and C are transmission curves for glasses having, respectively, compositions 8 and 10 in TABLE I of this application.

It will be noted that curves B and C for the present glasses are positioned to the left of Curve A and are significantly steeper than curve A. This provides the desired sharp transmission edge in the UV portion of the spectrum while positioning the edge at somewhat shorter wavelengths. Thus, the total solar radiation transmitted by the present glasses is enhanced.

This result was achieved by decreasing the contents of both $CeO_2$ and $TiO_2$ in the present commercial glass. The result was particularly surprising since it was believed that other properties. The TABLE shows log DC resistivity values at three different temperatures for four different glasses. The glasses are examples 20, 10, 4 and 13 in TABLE I. It will be seen that the resistivity of glasses 4 and 13 are substantially lower than the other two glasses.

TABLE II

| Log (rho) | 20 | 10 | 4 | 13 |
|---|---|---|---|---|
| 25° C. | 15.26 | 15.33 | 13.88 | 12.79 |
| 250° C. | 8.17 | 8.08 | 7.28 | 6.71 |
| 350° C. | 6.66 | 6.55 | 5.87 | 5.43 |

A further, unforeseen advantage, accruing from the present glasses, is their relatively low liquidus temperatures, and their high viscosity values at the liquidus temperature. This combination of properties; tends to reduce the tendency for crystallization to occur during drawing of the microsheet. It also tends to avoid the formation of defect stones that grow in stagnant pockets of glass that occur in the microsheet drawing equipment. The tendency for these problems to occur has seriously limited the time between shutdowns required to clean the drawing equipment. This, of course, drives up the cost of production.

TABLE III, below, sets forth liquidus temperatures and viscosity values in kilopoises (kP) for six (6) of the glasses shown in TABLE I. As before, example 20 is the glass of example 5 in TABLE I of the Danielson patent. The liquidus values are internal liquidus values determined from a 24 hour, gradient test.

TABLE III

|  | 20 | 10 | 4 | 7 | 8 | 9 |
|---|---|---|---|---|---|---|
| Comp'n/ Liq. T Int. (C) | 942 | 810 | 865 | 865 | 835 | 840 |
| HT visc. @ Liq. (kP) | 50 | 2500 | 170 | 170 | 440 | 750 |

Broadly, the glasses of the present invention consist essentially of, in weight percent as calculated on an oxide basis:

| $SiO_2$ | 59–69 | ZnO | 6.5–8.5 |
|---|---|---|---|
| $B_2O_3$ | 8.5–14 | $CeO_2$ | 0.25–3.0 |
| $Al_2O_3$ | 2–2.5 | $TiO_2$ | 0–1 |
| $Na_2O$ | 5.5–12.5 | $CeO_2 + TiO_2$ | 0.5–4 |
| $K_2O$ | 0–8 | $Sb_2O_3$ | 0–0.5 |

Optimum properties, particularly a combination of maximum solar transmission with a sharp cutoff in the UV, are achieved with glasses having compositions consisting essentially of, in weight percent as calculated on an oxide basis:

| $SiO_2$ | 59–69 | ZnO | 6.5–7.5 |
|---|---|---|---|
| $B_2O_3$ | 8.5–12 | $CeO_2$ | 0.25–<2 |
| $Al_2O_3$ | 2–2.5 | $TiO_2$ | 0.25–1 |
| $Na_2O$ | 6.5–12 | $Sb_2O_3$ | 0–0.5 |
| $K_2O$ | 2–8 | | |

A preferred glass composition is that shown as Example 30 in TABLE I. A glass having this composition has physical properties closely matching those of the present commercial glass corresponding to example 20 in TABLE I. This not only facilitates the transition to the new glass in the previously used melting unit, but also fabrication of the solar cell. In particular, the glass has a CTE of $74.3 \times 10^{-7}/°$ C. between 25° and 300° C., a softening point of 725° C. and a strain point of 5180° C.

We claim:

1. A borosilicate glass that has properties that enable the glass to be drawn as microsheet, that has a transmission greater than 90% at wavelengths between 380 and 1200 nm., that has a sharp cutoff between 310 and 370 nm., that has a transmission no greater than 50% at 330 nm., and that has a composition consisting essentially of, expressed in terms of weight percent on an oxide basis:

| $SiO_2$ | 59–69 | ZnO | 6.5–8.5 |
|---|---|---|---|
| $B_2O_3$ | 8.5–14 | $CeO_2$ | 0.25–3 |
| $Al_2O_3$ | 2–2.5 | $TiO_2$ | 0–1 |
| $Na_2O$ | 5.5–12.5 | $CeO_2 + TiO_2$ | 0.5–3.5 |
| $K_2O$ | 0–8 | $Sb_2O_3$ | 0–0.5. |

2. A borosilicate glass in accordance with claim 1 wherein the $Na_2O:K_2O$ ratio, in weight percent, is at least 1:1 and up to about 6:1.

3. A borosilicate glass in accordance with claim 1 having a liquidus temperature below 900° C. and a viscosity at the liquidus temperature that is greater than 50 kilopoises.

4. A borosilicate glass in accordance with claim 1 wherein the $Na_2O:K_2O$ ratio, in weight percent, is greater than 2:1 and the log DC resistivity is less than 15.5 at 25° C.

5. A borosilicate glass in accordance with claim 1 wherein the $CeO_2$ content is less than 2 weight percent.

6. A borosilicate glass in accordance with claim 1 containing both $CeO_2$ and $TiO_2$ in a total amount not over about 2 weight percent.

7. A borosilicate glass in accordance with claim 1 that has a composition consisting essentially of, expressed in terms of weight percent on an oxide basis:

| $SiO_2$ | 59–69 | ZnO | 6.5–7.5 |
|---|---|---|---|
| $B_2O_3$ | 8.5–12 | $CeO_2$ | 0.25–<2 |
| $Al_2O_3$ | 2–2.5 | $TiO_2$ | 0.25–1 |
| $Na_2O$ | 6.5–12 | $Sb_2O_3$ | 0–0.5 |
| $K_2O$ | 2–8. | | |

8. A borosilicate glass in accordance with claim 7 having a composition consisting of, in weight percent on an oxide basis:

| $SiO_2$ | 64.45 | ZnO | 7.0 |
|---|---|---|---|
| $B_2O_3$ | 11.10 | $CeO_2$ | 0.50 |
| $Al_2O_3$ | 2.25 | $TiO_2$ | 0.75 |
| $Na_2O$ | 7.15 | $Sb_2O_3$ | 0.25 |
| $K_2O$ | 6.65. | | |

9. A solar cell having, as a component, a microsheet cover glass having a transmission greater than 90% at wavelengths between 380 and 1200 nm., a sharp cutoff between 310 and 370 nm., a transmittance no greater than 50% at 330 nm., and a composition consisting essentially of, expressed in terms of weight percent, on an oxide basis:

| $SiO_2$ | 59–69 | ZnO | 6.5–8.5 |
|---|---|---|---|
| $B_2O_3$ | 8.5–14 | $CeO_2$ | 0.25–3 |
| $Al_2O_3$ | 2–2.5 | $TiO_2$ | 0–1 |
| $Na_2O$ | 5.5–12.5 | $CeO_2 + TiO_2$ | 0.5–3.5 |
| $K_2O$ | 0–8 | $Sb_2O_3$ | 0–0.5. |

10. A solar cell in accordance with claim 9 wherein the microsheet cover glass is about 150 microns (0.006 inches) in thickness.

11. A solar cell in accordance with claim 9 wherein the microsheet cover glass has a liquidus temperature below 900° C. and a viscosity at the liquidus temperature greater than 50 kilopoises, whereby microsheet can be drawn over an extended period of time without crystal buildup.

12. A solar cell in accordance with claim 9 wherein the microsheet cover glass has a log DC resistivity less than about 15.5 at 25° C.

13. A solar cell in accordance with claim 9 wherein the microsheet cover glass has a composition consisting essentially of, expressed in terms of weight percent on an oxide basis:

| | | | |
|---|---|---|---|
| SiO$_2$ | 59–69 | ZnO | 6.5–7.5 |
| B$_2$O$_3$ | 8.5–12 | CeO$_2$ | 0.25–<2 |
| Al$_2$O$_3$ | 2–2.5 | TiO$_2$ | 0.25–1 |
| Na$_2$O | 6.5–12 | Sb$_2$O$_3$ | 0–0.5 |
| K$_2$O | 2–8. | | |

14. A solar cell in accordance with claim 13 wherein the microsheet cover glass has a composition consisting of, expressed in terms of weight percent on an oxide basis:

| | | | |
|---|---|---|---|
| SiO$_2$ | 64.45 | ZnO | 7.0 |
| B$_2$O$_3$ | 11.10 | CeO$_2$ | 0.50 |
| Al$_2$O$_3$ | 2.25 | TiO$_2$ | 0.75 |
| Na$_2$O | 7.15 | Sb$_2$O$_3$ | 0.25 |
| K$_2$O | 6.65. | | |

\* \* \* \* \*